United States Patent
Baldur

(10) Patent No.: US 6,219,437 B1
(45) Date of Patent: *Apr. 17, 2001

(54) METHOD AND APPARATUS FOR OBTAINING A SIGNATURE FROM A FIRED BULLET

(75) Inventor: Roman Baldur, Baie d'Urfe (CA)

(73) Assignee: Forensic Technology Wai Inc., Montreal (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/912,489

(22) Filed: Aug. 18, 1997

Related U.S. Application Data

(63) Continuation of application No. 08/365,751, filed on Dec. 29, 1994, now Pat. No. 5,659,489, which is a continuation-in-part of application No. 07/705,122, filed on May 24, 1991, now Pat. No. 5,390,108.

(51) Int. Cl.[7] ........................................... G06K 9/00
(52) U.S. Cl. ............................................. 382/108; 382/284
(58) Field of Search ................................. 705/1; 364/400, 364/524, 550, 551.01; 382/108, 228, 278, 284, 294, 100, 209, 152; 73/167; 356/72, 237, 237.2; 702/40, 155, 159, 172, 167, 127

(56) References Cited

U.S. PATENT DOCUMENTS

| | | | |
|---|---|---|---|
| 3,680,966 | * | 8/1972 | Cofek et al. ........................ 356/241 |
| 3,712,466 | * | 1/1973 | Aubry et al. ............................ 209/73 |
| 3,780,614 | * | 12/1973 | Maier ...................................... 86/1 R |
| 3,800,074 | * | 3/1974 | Fletcher et al. .......................... 178/6 |
| 4,923,066 | * | 5/1990 | Ophir et al. .......................... 209/538 |
| 5,134,661 | * | 7/1992 | Reinsch .................................... 382/1 |
| 5,140,647 | * | 8/1992 | Ise et al. ................................. 382/41 |
| 5,214,713 | * | 5/1993 | Juvinall .................................... 382/8 |
| 5,390,108 | * | 2/1995 | Baldur et al. ......................... 364/409 |
| 5,659,489 | * | 8/1997 | Baldur .................................. 364/524 |

OTHER PUBLICATIONS

IEE Colloquim on Electronic Images and Image Processing in Security and Forensic Science Digest #087, abstract only, May 1990.*

(List continued on next page.)

Primary Examiner—Andrew W. Johns
(74) Attorney, Agent, or Firm—Cantor Colburn LLP

(57) ABSTRACT

A method for obtaining a signature from a fired bullet by mounting the bullet to turn substantially about a longitudinal axis of the bullet, illuminating a surface of the bullet, obtaining and storing a frame image at a given position of the surface portion using microscope optics, the frame image having a transverse extent substantially transverse to the longitudinal axis, advancing the frame image position by an amount less than a transverse extent of the frame image, repeating the last two steps a plurality of times to obtain a plurality of overlapping frame images, combining the frame images to form a continuous composite image having a transverse extent much greater than the transverse extent of the frame images, and computing a signature of the composite image along a line extending in the transverse extent of the composite image. The points of the signature are determined from image data along a direction of striations in the composite image which is at an angle with respect to the transverse line and the longitudinal axis.

11 Claims, 6 Drawing Sheets

OTHER PUBLICATIONS

NTIS Report #NASA–CR–139371, Contract #NAS7–100, abstract only, Jul. 1974.*

Arndt et al, "Bullet Signature Identification Using Time Domain Computer Techniques", Proceedings of Int. Carnahan Conf. pp. 145–151, 1983.*

Unitech Inc., "Ballistic Signature Identification System Study", Report #NASA–CR–147820, Contract #NAS9–14708, 40 pages, May 1976.*

Arndt, G.D., "Ballistic Signature Identification . . . ", 1977 Caarnahan Conf. on Crime Countermeasures, p. 235, abstract only.*

Gardner, G.Y., "Computer Identification of Bullets", 1977 Carnahan Conf. on Crime Countermeasures, pp. 149–166.* Identification and Classification of Bullets, Dissertation, Submitted in Partial Fulfillment of the Requirements for the Degree of Doctor of Philosophy (Electrical Engineering) at the Polytechnic Institute of New York, by Geoffrey Y. Gardner, Jun. 1976.*

* cited by examiner

US 6,219,437 B1

METHOD AND APPARATUS FOR OBTAINING A SIGNATURE FROM A FIRED BULLET

This application is a continuation of U.S. application Ser. No. 08/365,751, filed Dec. 29, 1994, now U.S. Pat. No. 5,659,489, which is a continuation-in-part of U.S. application Ser. No. 07/705,122, filed May 24, 1991, now U.S. Pat. No. 5,390,108.

TECHNICAL FIELD

The invention relates to a system for the analysis and comparison of surfaces of fired bullets. The invention also relates to a method of analyzing and comparing the surfaces of fired bullets using the inventive system.

DESCRIPTION OF PRIOR ART

Forensic firearm examiners have to match bullets in order to determine if they have been fired from the same gun. Under present procedures, two bullets are placed under a comparison microscope, and the bullets are viewed at the same time by the examiner who compares the characteristics of their outer surfaces to determine if there is a match between them. As the reason for determining whether there is or is not a match is to present evidence in legal proceedings, the final step in the determination is normally performed by a human being who can subsequently appear as a witness in the legal proceeding. Nevertheless, the burden of the examiner could be greatly alleviated by an automated system for providing degree of match between pairs of bullets. Such system would preferably be an opto-electronic system.

Optoelectronic systems for comparing bullets are known in the prior art as at, for example, U.S. Pat. No. 3,680,966, Cofek et al, Aug. 1, 1972. However, the Cofek et al apparatus examines the flash hole of cartridge cases after manufacture but before firing.

U.S. Pat. No. 3,780,614, Maier, Dec. 25, 1973, teaches a multiple bullet and cartridge holder for forensic microscopes which provide improved indexing and manipulation.

The problem is also addressed in COMPUTER IDENTIFICATION AND CLASSIFICATION OF BULLETS, a Dissertation Submitted in Partial Fulfillment of the Requirement for the Degree of Doctor of Philosophy (Electrical Engineering) at the Polytechnic Institute of New York by Geoffrey Y. Gardner, June 1976.

SUMMARY OF INVENTION

It is therefore an object of the invention to provide a method for obtaining a signature from a fired bullet, comprising the steps of: a) mounting the bullet to turn substantially about a longitudinal axis thereof; b) illuminating a surface portion of said bullet; c) obtaining and storing a frame image at a given position of said surface portion using microscope optics, said frame image having a transverse extent substantially transverse to said longitudinal axis; d) advancing said position by an amount less than a transverse extent of the frame image; e) repeating the steps (c) and (d) a plurality of times to obtain a plurality of overlapping frame images; f) combining the frame images to form a continuous composite image having a transverse extent much greater than said transverse extent of said frame images; and g) computing a signature of the composite image along a line extending in said transverse extent of the composite image, wherein points of the signature are determined from image data along a direction of striations in said composite image, The direction is at an angle with respect to the transverse line and the longitudinal axis.

Preferably, step (f) comprises positioning each additional one of the frame images in at least one direction, the one direction being along the transverse extent, until overlapping portions of the additional frame image and the composite image match, and adding to the composite image a non-overlapping portion of the additional frame image.

The invention also provides an apparatus for obtaining a signature from a fired bullet, comprising: means for rotatably mounting the bullet to turn substantially about a longitudinal axis of the bullet; means for illuminating a surface portion of the bullet; means for obtaining and storing a frame image at a given position of the surface portion using microscope optics, the frame image having a transverse extent substantially transverse to the longitudinal axis; motor means for advancing the position by an amount less than a transverse extent of the frame image; means for combining a plurality of the frame images to form a continuous composite image having a transverse extent much greater than the transverse extent of the frame images; and means for computing a signature of the composite image along a line extending in the transverse extent of the composite image, wherein points of the signature are determined from image data along a direction of striations in the composite image, the direction being at an angle with respect to the line and the longitudinal axis.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
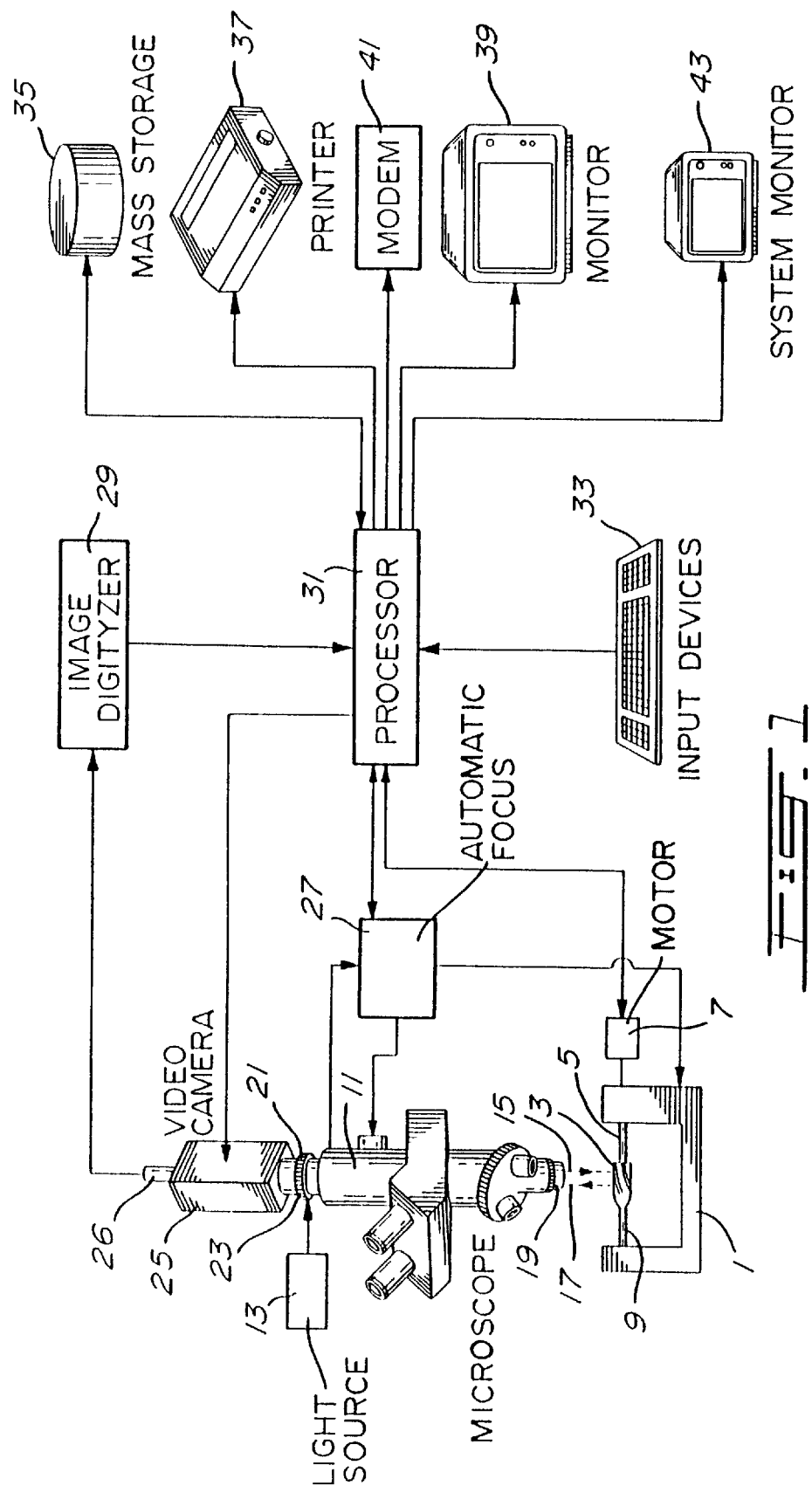
FIG. 1 is a block diagram of the inventive system.

Referring to FIG. 1, the system includes a bullet carrier 1 for rotatably maintaining a bullet 3 under examination in a position to be examined by the remainder of the system. One end of the bullet 3 is detachably attached to a rotating rod 5 which is rotated by a motor 7. The other end of the bullet is detachably attached to a supporting rod 9.

Disposed above the bullet is a microscope 11. A light source 13 is provided to direct light 15 at the surface of the bullet 3. In the illustrated embodiment the light source directs the light 15 to the surface of the bullet 3 through the microscope. Obviously, other arrangements are possible.

The light 15 is reflected from the surface of the bullet and reflected light 17 is directed to the light receiving (objective)

lens 19 of the microscope. In the illustrated embodiment, light 15 is also emitted through the light receiving (objective) lens 19.

The microscope 11 also includes an output 21 which is connected to be in optical communication with an input 23 of a video camera 25. As is well known, the video camera converts the optical signal to an electrical signal. The optical signal is an analog representation of the characteristics of the outer surface of the bullet, and the video camera converts the optical signal to an electrical analog of the optical analog at the output terminal 26 of the video camera.

The output terminal 26 of the video camera 25 is connected to an input terminal of ANALOG/DIGITAL converter ADC 29. The ADC 29 converts the electrical analog signal to electrical coded digital representations of the electrical analog signal and, thereby, the optical analog signal and, thereby, the characteristics of the outer surface of the bullet.

The coded digital signal is then fed, from an output terminal of ADC 29, to an input terminal of processor means 31.

Instructions, or other information, can be fed to the processor means 31 using an input device, such as a keyboard 33, which is connected to a further input terminal of the processor means 31.

The processor means 31 can contain within it a mass storage means for storing the coded digital representations. Alternatively, the processor means 31 can be connected to an external mass storage means 35 in an input/output relationship so that the coded digital representations will be forwarded by the processor means 31 for storage in the mass storage means 35, and such that the processor means 31 can access the coded digital representations from the mass storage means 35, as is well known in the art.

Other output terminals of the processor means 31 can be connected to a printer 37, a video monitor 39, or, for communications to other locations, a MODEM 41. As usual, a system monitor 43 is also connected to the processor means 31 for monitoring the performance of the entire system.

Automatic focusing means 27 is provided to maintain the microscope in focus. As is well known, this can be accomplished by either moving the bullet to address the position between the top surface of the bullet and the lens, or by moving the lens for the same purpose. Automatic focusing means 27 receives a signal from the microscope camera or an external device to determine if the microscope is in focus. If it is not, it will receive a signal from the processor 31 to appropriately cause either the bullet or the microscope lens to be moved.

It is also noted that there is a connection between the processor 31 and the motor 7 as well as the video camera 25. In accordance with the invention, the processor 31 is preferably programmed to synchronize the rotation of the bullet with the recording of video frame images. Specifically, the processor would cause the bullet to rotate by rotating motor 7 through a predetermined angle. It will then activate video camera 25 to record the image at the top surface of the bullet with the bullet in this first position. It will then again cause the bullet to be rotated through the same predetermined angle, and it will then turn on the video camera for recording of an overlapping frame image of the top surface at the second position. This will continue until a continuous band around the surface of the bullet has been recorded as will be described below.

Figure 2:
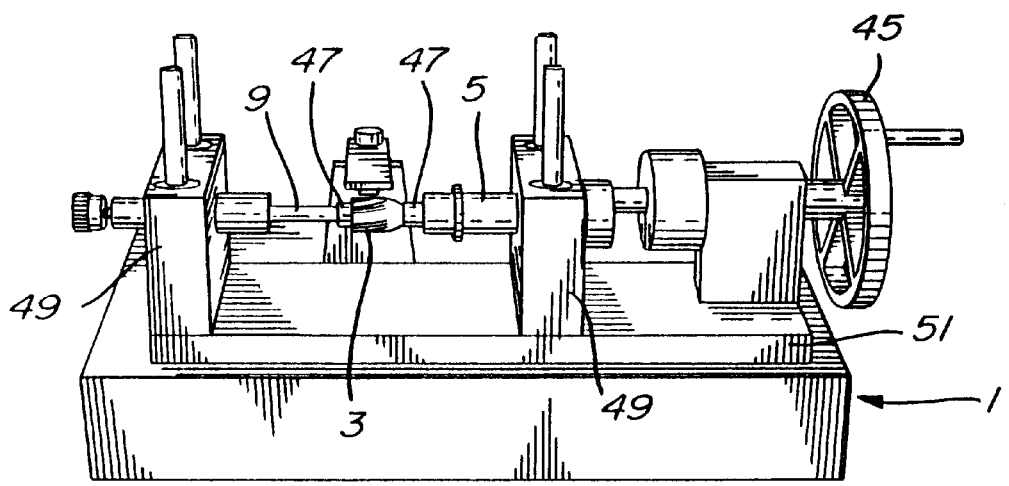
FIG. 2 illustrates a particular embodiment of a bullet carrier used in the invention.

Turning now to FIG. 2, there is illustrated a bullet carrier 1 wherein the motor 7 is replaced with a manual rotator 45. Mounting adaptors 47 are affixed to each end of the bullet and are connected to the inner ends of rotating rod 5 and support rod 9. The rods 5 and 9 are supported by arches 49, and the arches are disposed on a base 51. The end pieces permit the bullet to rotate in such a manner as to produce minimum variations of the distance between the surface being investigated and the microscope lens.

In operation, the base 51 is disposed underneath the microscope such that an imaginary line extending along and beyond the direction of light 15 intersects the axis of rotation (the longitudinal axis) of the bullet 3. The bullet is then rotated and sectors of the bullet are illuminated by the light 15. Light 15 illuminates a plurality of sectors such that, the plurality of sectors, when connected end-to-end, form a continuous band or composite image around the peripheral surface of the bullet. The video camera then records a plurality of frame images such that each frame records a complete sector plus overlap between that sector and an adjacent sector, so that each frame will include a sector and overlap, at one end thereof, between that sector and a following sector. The plurality of frames will consist of the complete band of sectors plus the overlap between adjacent ones of each of the sectors.

The optical representations of the surface of the bullet, as reflected back to the microscope by light 17, is first magnified by the microscope and then converted to an electrical analog signal in video camera 25. It is subsequently converted to an electric coded digital signal in ADC 29.

Figure 3A:
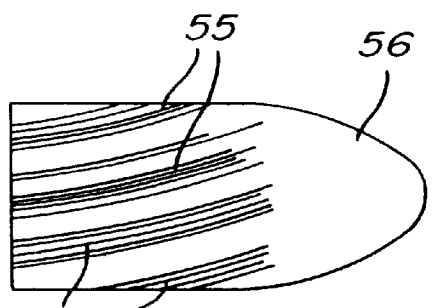
FIG. 3A is a schematic representation of a fired bullet showing striations inscribed by the gun barrel as the bullet is fired from the gun barrel.

In a preferred embodiment of the invention, the signature of the bullet for each frame is computed and recorded along with the frame as will be discussed below. As is known in the art, and as is explained in the Gardner reference, the signature comprises some set of striation features quantified for use in verification and classification of bullets. As is also known in the art, and as is also explained in the Gardner reference, striations 55 (see FIG. 3A) are engraved on the surface of the bullet by irregularities in the barrel of the gun. Other lines and scratches 56 are also engraved on the surface of the bullet. Because the bullet rotates as it passes through the barrel, the striations 55 will be at an angle to the longitudinal axis 57 of the bullet as shown in FIG. 3A. Lines and scratches 56 are of a less significant and random nature.

Figure 3B:
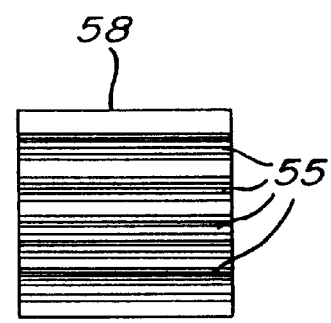
FIG. 3B illustrates a frame modified so that the striations extend horizontally in the frame.
Figure 4A:
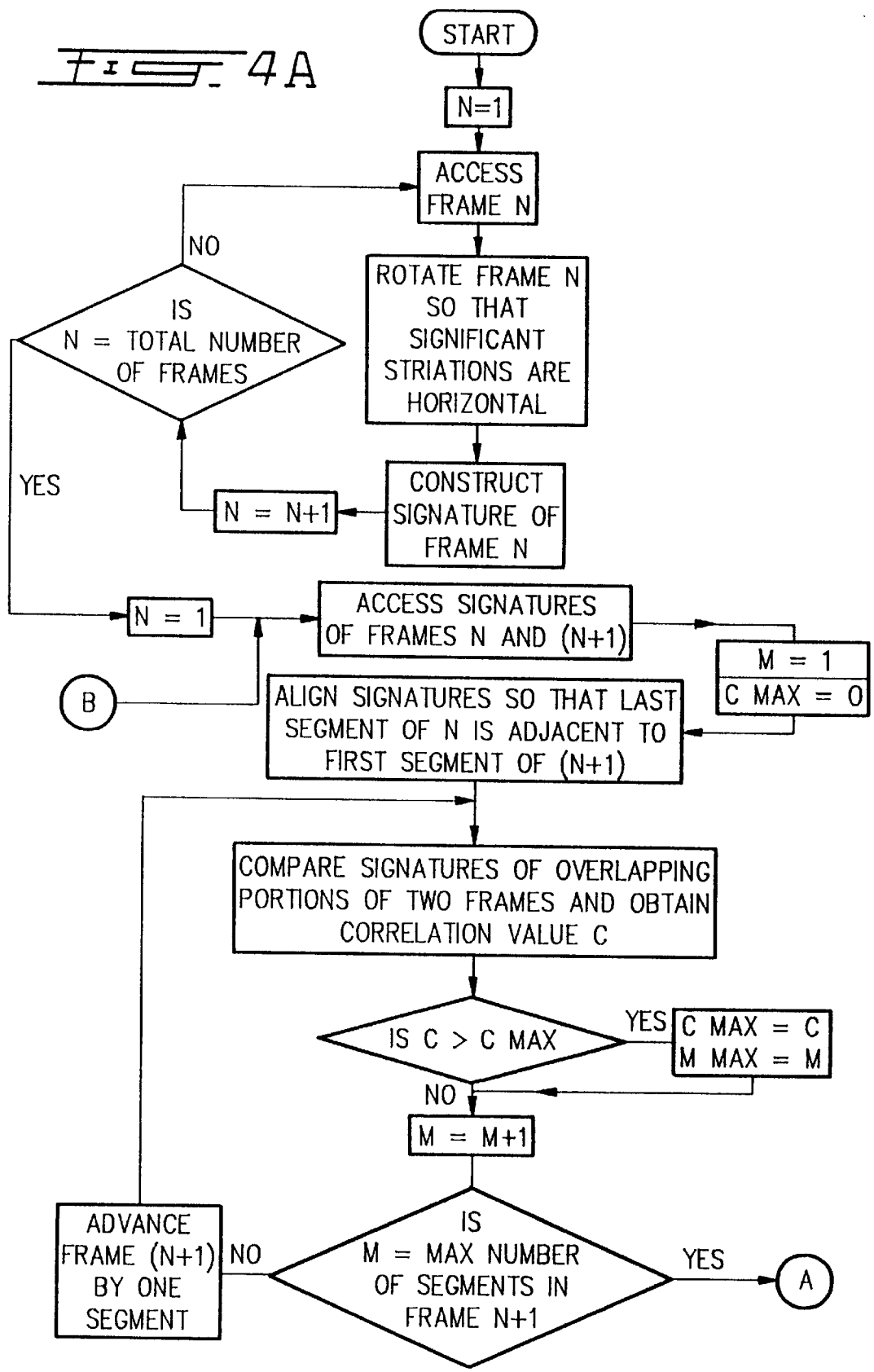
FIGS. 4A and 4B illustrate a flow chart for a computer program which aligns the striations parallel to the longitudinal axis of the bullet, and which eliminates the overlap between frames.
Figure 4B:
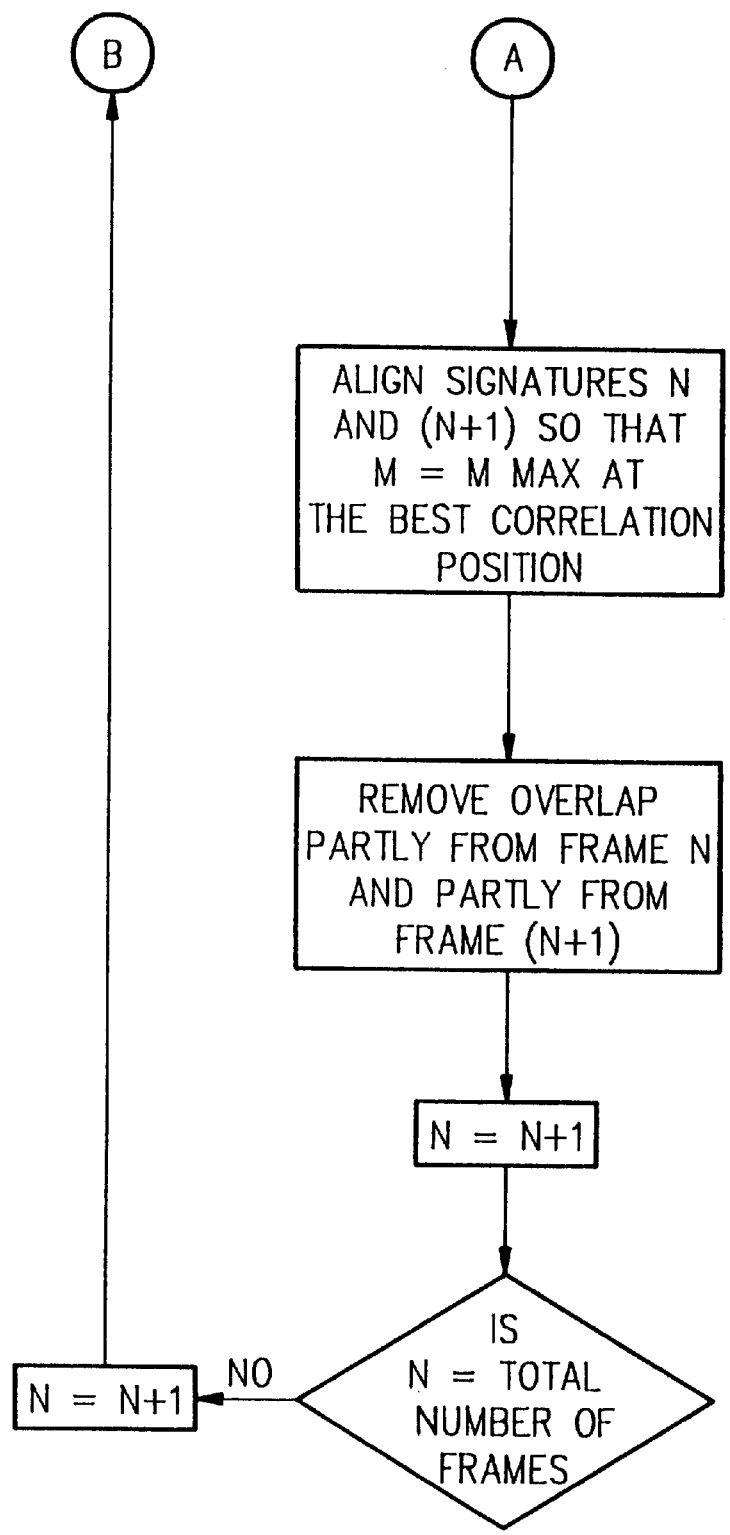
Figure 5A:
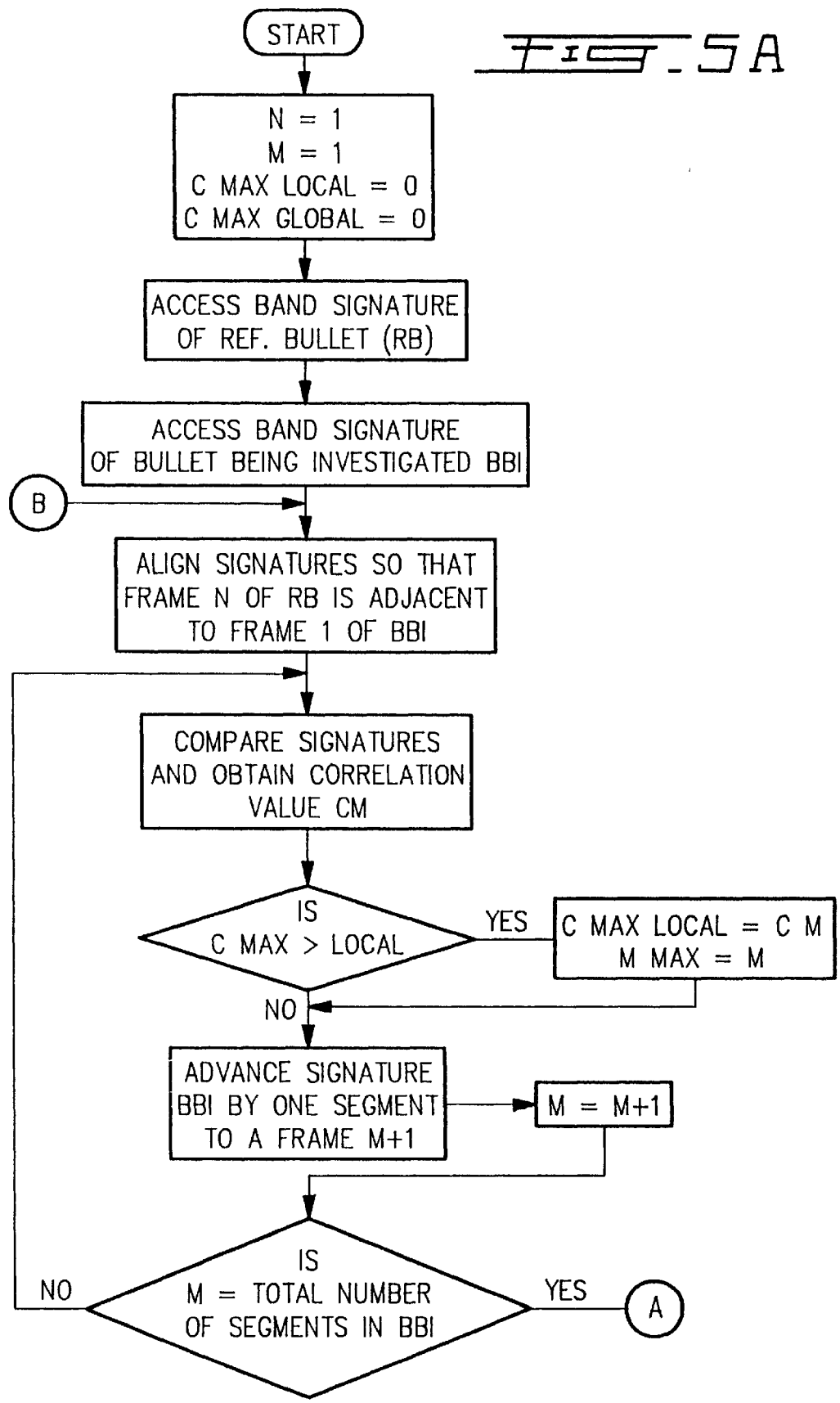
FIGS. 5A and 5B illustrate a flow chart for a computer program for comparing the characteristics of a reference bullet with the characteristics of a bullet under examination.
Figure 5B:
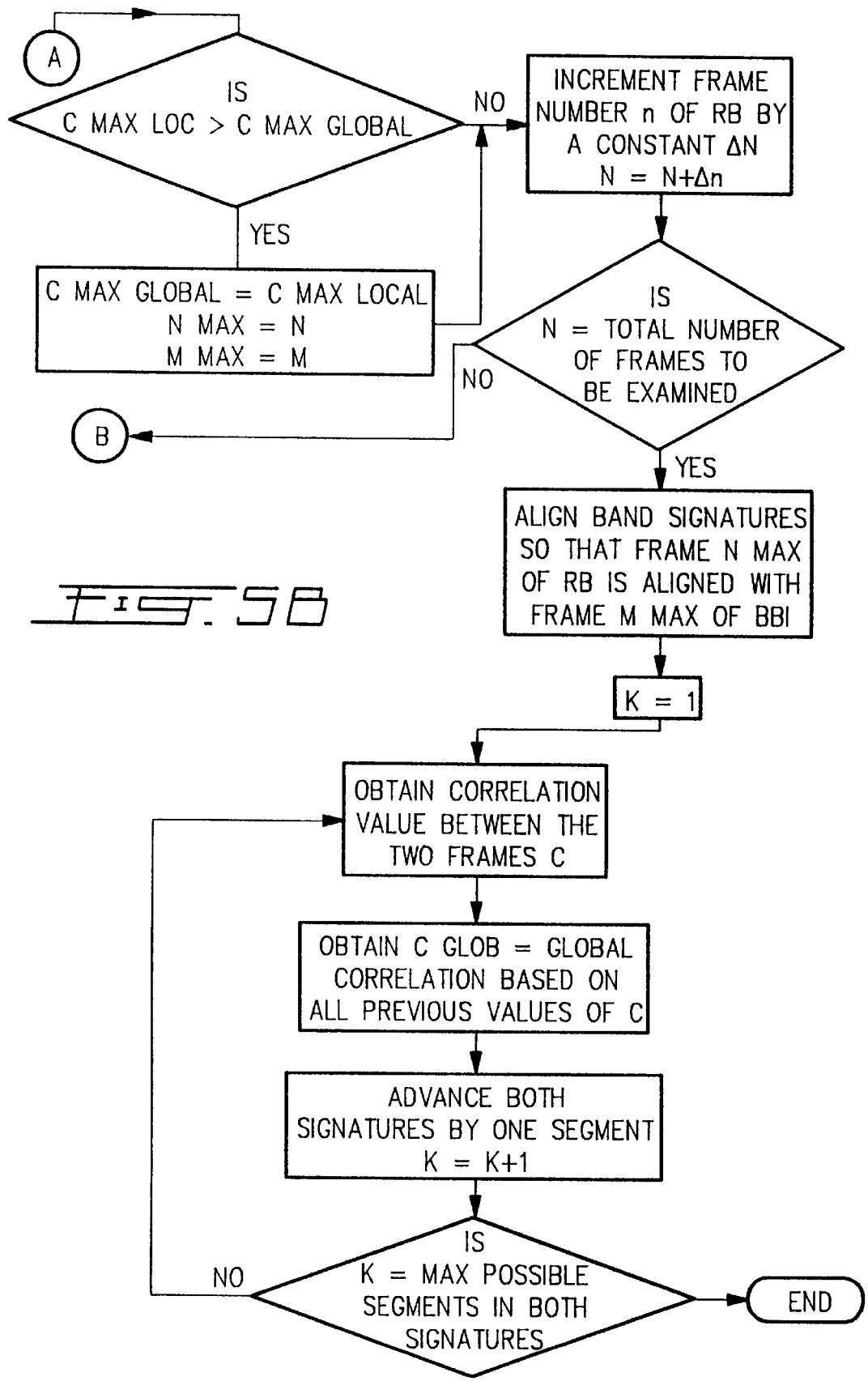

In accordance with the invention, the data in each frame is rotated by software using a special purpose algorithm which determines the predominant slope of the significant lines so that, if the data were converted to visual signals and displayed, the striations 55 would be in a horizontal attitude in frame 58 as shown in FIG. 3B.

In the preferred embodiment, the consecutive frame images are placed side-by-side and moved until their overlap matches. The overlap is then removed and the remaining portion of the new frame image is added to the composite image.

To compute the signature, the light intensity magnitudes of each row across the width of the band, i.e. along a line extending in a transverse extent of the composite image, are subjected to mathematical computations whereby to obtain a number representative of each row of pixels. These numbers constitute the signature, and, when signatures are compared, it is, of course, these numbers which are compared. The signature is computed using data which is from the striations 55 direction for each point along the transverse direction of the signature. When the image is rotated, the striation direction is horizontal, with the transverse extent being vertical. In the preferred embodiment, the signature is computed using the composite image.

Alternatively, the signature of the first frame is placed in side-by-side arrangement with the signature of the second frame such that the bottom of the signature of the first frame is disposed adjacent the top of the second frame, and there is overlap of at least one segment between frames. A segment can be several pixels high but is, preferably, only a single pixel high. The signatures are then compared to obtain a correlation value. The signature of the second frame is then moved upwardly one segment, and the adjacent signatures are again compared to obtain a second correlation value.

It is noted that, initially, the overlap of a few pixels will give a poor correlation. As the amount of manipulated overlap reaches the actual overlap, the correlation will increase to a maximum, when the actual overlap is reached, and will begin to fall again as soon as the manipulated overlap exceeds the actual overlap.

The manipulated overlap can then be returned to the position of maximum correlation and, at this point, the actual overlap between the two adjacent frames has been determined. The overlapping portion will then be deleted from the bottom end of the first frame so that the bottom end of the first frame corresponds exactly with the end of a corresponding first sector. The top of the second frame already corresponds exactly with the adjacent end of a corresponding second sector. Accordingly, with the overlap removed from the first frame, and with the first and second frames being joined together bottom end to top end respectively, they will represent the first and second sectors of the surface of the bullet in a continuous fashion and without gaps or overlap. (Of course, the bottom end of the second frame will include overlap between the second sector and the third sector. However, this will also be deleted further on in the process.)

Although the foregoing has described a process wherein the entire overlap is deleted from one frame, it is also possible to obtain the same effect by deleting the overlap only partially from each adjoining frame, i.e., part of the overlap is deleted from one frame and the remainder from an adjoining frame.

This procedure is continued until all of the overlap has been deleted. The remaining frames will then form a continuous band, without overlap, and without gaps, around the peripheral surface of the bullet which has been examined.

Although the foregoing has described a process wherein signature correlation is used to line up consecutive frames, other features of the consecutive frames could be used for this purpose.

It is of course understood that the above procedures are carried out in the microprocessor which is driven by appropriate software as will be discussed below. In determining the correlation between segments, the adjacent numbers of the signatures are mathematically compared to each other. For example, if the numbers are subtracted from each other, then a small magnitude remainder will indicate a high correlation and vice-versa.

In order to compare a bullet under investigation with a reference bullet, a continuous band is prepared for each bullet as per the above-described procedure and stored in the memory.

The signatures of the reference bullet and the bullet under investigation are then accessed by the processor and electronically placed in side-by-side arrangement. Two adjacent frames are then compared, one segment at a time, and the correlation value is mathematically calculated and stored.

The second band is then advanced relative to the first band by one segment so that the first frame of the first band is now adjacent the second frame of the second band. Once again, the frames are compared on a segment-by-segment basis to obtain a correlation value. This is continued until the first frame of the first band has been compared with each frame of the second band.

The first band is then advanced to another frame and the second frame of the first band is then compared with each frame of the second band. This process is continued until several frames of the first band have been compared with each frame of the second band. The two bands are then aligned along their best correlation point.

The two bands will then be compared on a segment-by-segment basis to obtain a correlation value for each pair of segments of the two bands. This creates a list of correlation values for the complete length of the two bands, and this list is then subjected to a mathematical calculation whereby to obtain a global correlation factor.

It is also known that when a bullet is fired into an object, the bullet may be distorted so that it is no longer cylindrical in shape. Because different bullets will be differently distorted depending on the object into which they have been fired, the surface characteristics of two bullets fired from the same gun will not necessarily be identical. In order to take this into account, the length of each signature is preferably expanded and contracted, and the expanded signature of the frame of one band is compared with the signature of the frame of the other band, as is also the contracted signature. Thus, the frames are compared so that one frame of one band remains as is throughout the comparison process and the other frame is compared with each signature, expanded and contracted. The best correlation point of the three comparisons is selected both for the purpose of aligning the bands and for the purpose of obtaining a global correlation factor.

Flow charts for the software to drive the processor in the above processes are illustrated in FIGS. 4A, 4B, 5A and 5B which are self-explanatory.

As can be seen, with the inventive apparatus and method, one can obtain a reasonable first estimate degree of match between two bullets. As above-mentioned, the two bullets will normally have to be viewed by a forensic expert both for the purpose of making a final decision and also so that the forensic expert can testify in judicial proceedings. In spite of this mandatory participation by the forensic expert, his load is greatly reduced by the first estimate approximation.

Although the above describes a method in which a single band is obtained, it is within the scope of the invention to obtain two or more bands.

Although a particular embodiment has been described, this was for the purpose of illustrating, but not limiting, the invention. Various modifications, which will come readily to the mind of one skilled in the art, are within the scope of the invention as defined by the appended claims.

What is claimed is:

1. A method for processing images of a fired bullet to obtain a composite image suitable for analysis of the fired bullet, comrprisinig the steps of:
   a) mounting said bullet to turn substantially about a longitudinal axis of said bullet;
   b) illuminating a surface portion of said bullet;
   c) obtaining and storing a frame image at a given position of said surface portion using microscope optics, said frame image having a transverse extent substantially transverse to said longitudinal axis;
   d) advancing said position by an amount less than a transverse extent of said frame image;

e) repeating said steps (c) and (d) a plurality of times to obtain a plurality of overlapping frame images; and f) combining said frame images to form a continuous composite image having a transverse extent much greater than said transverse extent of said frame images.

2. The method as claimed in claim 1, wherein said step (f) comprises positioning each additional one of said frame images in at least one direction, said one direction being along said transverse extent, until overlapping portions of said additional frame image and said composite image match, and adding to said composite image a non-overlapping portion of said additional frame image.

3. The method as claimed in claim 2, wherein said at least one direction comprises two orthogonal directions.

4. An apparatus for processing images of a fired bullet to obtain a composite image suitable for analysis of a fired bullet, comprising:

means for rotatably mounting said bullet to turn substantially about a longitudinal axis of said bullet;

means for illuminating a surface portion of said bullet;

means for obtaining and storing a frame image at a given position of said surface portion using microscope optics, said frame image having a transverse extent substantially transverse to said longitudinal axis;

motor means for advancing said position by an amount less than a transverse extent of said frame image; and means for combining a plurality of said frame images to form a continuous composite image having a transverse extent much greater than said transverse extent of said frame images.

5. The apparatus as claimed in claim 4, wherein:

said frame obtaining and storing means includes an electronic camera;

said motor means cause said bullet to rotate on said mounting means through a predetermined angle about said axis; and further comprising means for synchronizing turning on of said camera and actuating said motor means to record and store each one of said frame images of an area within said surface portion illuminated by said illumination means, until all said frame images for said composite image are recorded and stored.

6. The apparatus as claimed in claim 5, further comprising focusing means, wherein said synchronizing means adjust a focus before recording and storing said frame images.

7. A method for analyzing an image of a fired bullet to obtain a signature therefrom, the method comprising:

identifying a direction of striations and a direction of said signature;

determining an intensity of a linear series of points along said signature direction by evaluation of said image intensity along said direction of striations to obtain a linear set of values.

8. The method of claim 7 further comprising processing images of a fired bullet to obtain a composite image suitable for analysis of the fired bullet, comprising the additional steps of:

a) mounting said bullet to turn substantially about a longitudinal axis of said bullet;

b) illuminating a surface portion of said bullet;

c) obtaining and storing a frame image at a given position of said surface portion using microscope optics, said frame image having a transverse extent substantially transverse to said longitudinal axis;

d) advancing said position by an amount less than a transverse extent of said frame image; and e) repeating said steps (c) and (d) a plurality of times to obtain a plurality of overlapping frame images.

9. The method of claim 8 including the further step of combining said frame images to form a continuous composite image having a transverse extent much greater than said transverse extent of said fame images.

10. A method for processing images of a fired bullet to obtain a composite image suitable for analysis of the fired bullet, comprising the steps of:

a) mounting said bullet to turn substantially about a longitudinal axis of said bullet;

b) illuminating a surface portion of said bullet;

c) obtaining acid storing a frame image at a given position of said surface portion using microscope optics, said frame image having a transverse extent substantially transverse to said longitudinal axis;

d) advancing said position by an amount less than a transverse extent of said frame image;

e) repeating said steps (c) and (d) a plurality of times to obtain a plurality of overlapping frame images; and f) processing images to arrange the striations horizontally.

11. The method of claim 10 comprising the further step of combining said frame images to form a continuous composite image having a transverse extent much greater than said transverse extent of said frame images.

* * * * *